June 7, 1932.  H. A. HICKS  1,862,143
AIRPLANE WINDSHIELD
Filed Dec. 7, 1929

INVENTOR.
Harold A. Hicks.
BY
ATTORNEY.

Patented June 7, 1932

1,862,143

UNITED STATES PATENT OFFICE

HAROLD A. HICKS, OF DETROIT, MICHIGAN, ASSIGNOR TO FORD MOTOR COMPANY, OF DEARBORN, MICHIGAN, A CORPORATION OF DELAWARE

AIRPLANE WINDSHIELD

Application filed December 7, 1929. Serial No. 412,523.

The object of my invention is to provide an airplane windshield of simple, durable, and inexpensive construction.

A further object of my invention is to provide an airplane windshield especially adapted for cabin type airplanes. The glass sections of my improved windshield are so designed that the windshield may be opened to give greater visibility and still wind, snow, or rain will not enter the open portion.

The ordinary cabin type airplane is usually fitted with a windshield similar to an automobile windshield. Several disadvantages arise through the use of this type of windshield when the engine of the plane is placed in the nose of the fuselage with pilot's compartment directly behind. The slip stream created by the propeller blows directly on the windshield of the compartment so that oil particles which invariably collect around the motor are blown off by the slip stream and are deposited on the windshield. Near the end of comparatively long flights the visibility through the windshield is very poor so that the windshield must be opened if a safe landing is to be made.

When the ordinary windshield is opened the wind of the slip stream enters the pilot's compartment with such force that it is not only uncomfortable but also dangerous for the average pilot to operate under such conditions. For this reason, during winter flying the pilot usually prefers to leave the windshield closed and land the ship as best he can. It may be well to mention that blind flying or flying with instruments is not applicable to take offs or landings.

Further, rain and sleet which are ordinarily encountered during winter flying so covers the conventional windshield that it is practically opaque. The applicant has not been able to secure a windshield wiper which will clean off rain or sleet. When even a small amount of oil is deposited on the glass, all ordinary wipers simply smear the front of the windshield under such conditions, and if sleet is encountered the wiping blade usually freezes to the glass.

The applicant has devised a new windshield structure with which the pilot may have clear vision both toward the front and toward either side of the ship in spite of oil, rain, or sleet which may be deposited on the windshield glass.

Still a further object of my invention is to provide a windshield which will present very little head resistance so that such windshield may be said to be stream-lined.

With these and other objects in view, my invention consists in the arrangement, construction, and combination of the various parts of my improved device, as described in the specification, claimed in my claims, and illustrated in the accompanying drawing, in which:

Figure 1:
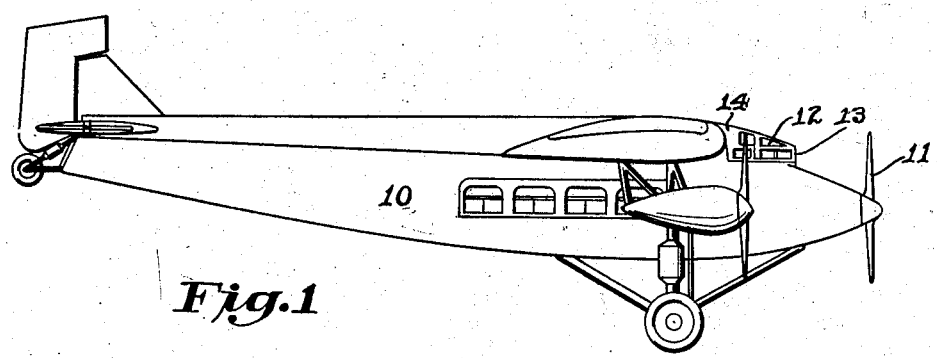
Figure 1 shows a side elevation of an airplane having my improved windshield installed thereon.

Referring to the accompanying drawing, I have used the reference numeral 10 to indicate generally the fuselage of an airplane. A motor having a propeller 11 is secured to the forward end of this fuselage in the conventional manner. A portion of the fuselage directly behind the propeller 11 is partitioned off to form a pilot's compartment and the roof 14 of this compartment is provided with a plurality of skylights so that the pilot may have a view directly above him. These skylights consist of glass sections 12 permanently fixed in suitable openings in the roof of the compartment.

Figure 2:
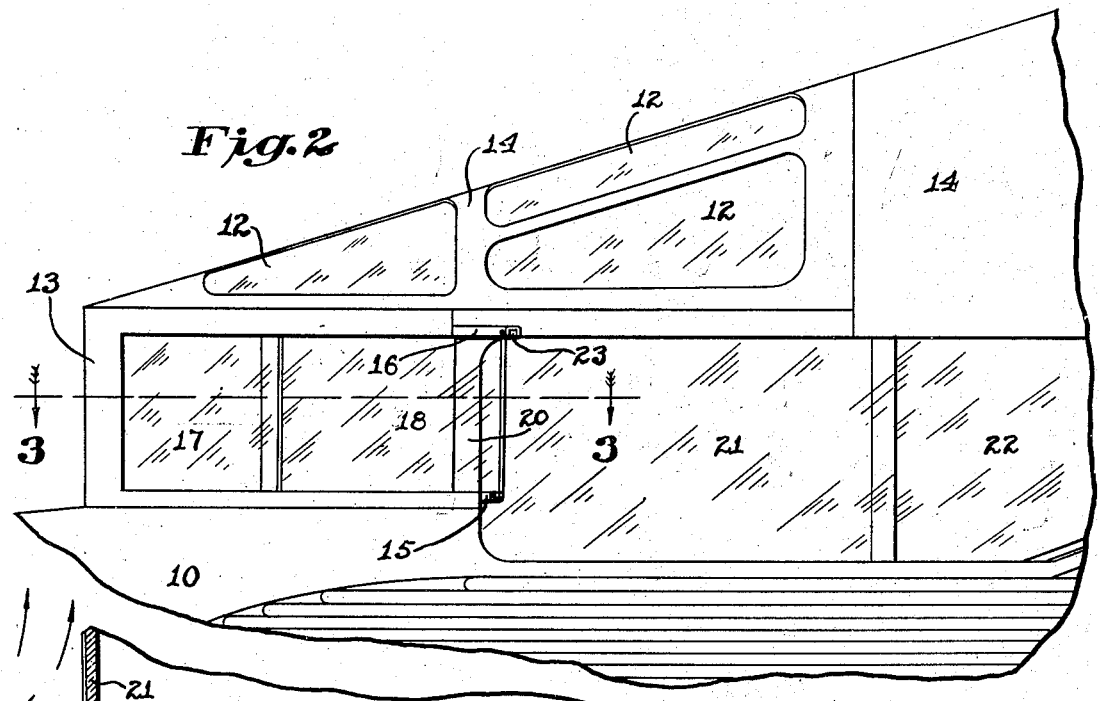
Figure 2 shows an enlarged side elevation of the airplane cabin shown in Figure 1.

Referring to Figure 2, a center upright 13 extends from the fuselage proper to the forward point of the roof 14 and a pair of side posts 20 extend upwardly from the sides of the fuselage and support the edges of the roof.

A pair of angularly disposed channel shaped glass runs 15 extend rearwardly and outwardly from the center post 13 to the side posts 20. These glass runs 15 are fastened on the upper portion of the fuselage and form lower tracks for slidable glass members which form the windshield. A like pair of inverted channel shaped glass runs 16 extend outwardly from the upper end of the center post 13 directly above the lower glass runs 15. These top glass runs are secured to the under side of the roof member 14.

Figure 3:
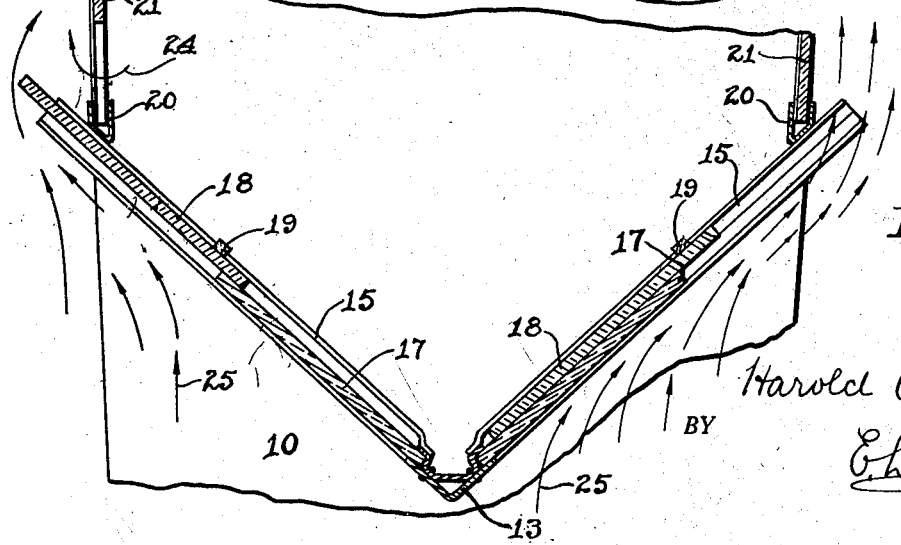
Figure 3 shows a sectional view taken on the line 3—3 of Figure 2.

A pair of front and rear overlapping rectangular sections of plate glass 17 and 18, respectively, are slidably mounted between the glass runs 15 and 16. Stop members 23 are secured in the outer end of the channel member 16 so that the glass sections may not accidentally be moved entirely out of these channels. Referring to Figure 3, the normal closed position of the windshield is shown at the left hand portion of the drawing, while the right hand half shows the open position of the device. Suitable lugs 19 cemented onto the inside of the glass 18 may be used for sliding the glass from one position to the other.

Suitable side glass runs, not shown in the drawing, are secured to the upper edges of the fuselage and to the under side of the roof 14. These runs support a pair of overlapping front and rear side windows 21 and 22, respectively, parallel to the side walls of the fuselage. The front side windows 21 may be pulled rearwardly to the position shown in the left hand half of Figure 3 so that an opening is provided between the posts 20 and these glass sections.

When it is desired to ventilate the cabin, one of the side glass sections 21 is moved to the position just mentioned and the front sections 17 and 18 allowed to remain closed. A suction will then be produced which draws air out of the cabin in the direction shown by the arrow 24.

The direction of the wind from the propeller slip stream is shown by arrows 25. This air stream strikes the glass at an angle and its direction is changed so that it flows tangent to the sections 17 and 18 at a high velocity. Considerable momentum is set up in this air current which offers a resistance to its change of direction thereby drawing air out of the cabin with what might be termed an ejector action.

When the visibility through the glass sections 17 and 18 becomes poor, the section 18 may be pushed forwardly to the position shown at the right in Figure 3. The momentum of the slip stream flowing tangent to these glass sections carries the air along this tangential path so that it flows directly by the open space between the glass 18 and the post 20 and does not enter the pilot's compartment. It may be readily seen that as no glass or similar substance is placed over this opening, no sleet, oil, or rain, can mar the visibility of the pilot therethrough.

The greater momentum of particles heavier than air, such as rain and sleet, tend to carry them further past this opening, so that the pilot may lean forward and obtain a clear view of the field in front and to one side of him without coming in contact with any of the particles blowing by the opening.

The principal advantages arising from the use of my improved device is that I have provided means for obtaining clear vision for the pilot and one which cannot be affected by wind, rain, sleet, or the like. A further advantage arises because the device is cheap to manufacture, consisting of only parts equivalent in cost to the ordinary parts of a windshield.

Still a further advantage arises because the device is of a shape which offers very little head resistance, and in this respect is also much superior to the ordinary windshield.

Some changes may be made in the arrangements, construction and combination of the various parts of my improved device without departing from the spirit of my invention, and it is my intention to cover by my claims, such changes as may be reasonably included within the scope thereof.

I claim as my invention:

1. In a cabin type airplane, parallel window glass runs extending along each side of the fuselage and spaced vertically from each other, said glass runs having overlapping glass windows longitudinally slidable therebetween, and parallel pairs of windshield glass runs extending from the forward center portion of the fuselage diagonally and rearwardly to each side thereof and spaced vertically from each other, each pair of said windshield runs having a pair of overlapping windshield glass sections diagonally slidable therebetween so as to intersect the plane of said windows, whereby said windshield sections and windows may be adjusted to provide an opening at either side of the fuselage adjacent to the apex of the angle at said intersection for the purpose described.

2. In an airplane fuselage having substantially parallel side walls, a roof portion spaced vertically from the upper edges of said walls, parallel window glass runs extending along the upper edge of the fuselage and the roof portion, respectively so as to be spaced vertically from each other, said glass runs having overlapping glass windows longitudinally slidable therebetween, and vertically spaced parallel pairs of windshield glass runs extending from the forward center portion of the fuselage and roof diagonally and rearwardly to each side thereof, said runs being secured to the fuselage and roof portion respectively, and each pair of said windshield runs having a pair of overlapping windshield sections slidable therebetween so as to intersect the plane of said windows, whereby said windshield sections and windows may be adjusted to provide an opening at either side of the fuselage adjacent to the apex of the angle at said intersection for the purpose described.

HAROLD A. HICKS.